UNITED STATES PATENT OFFICE.

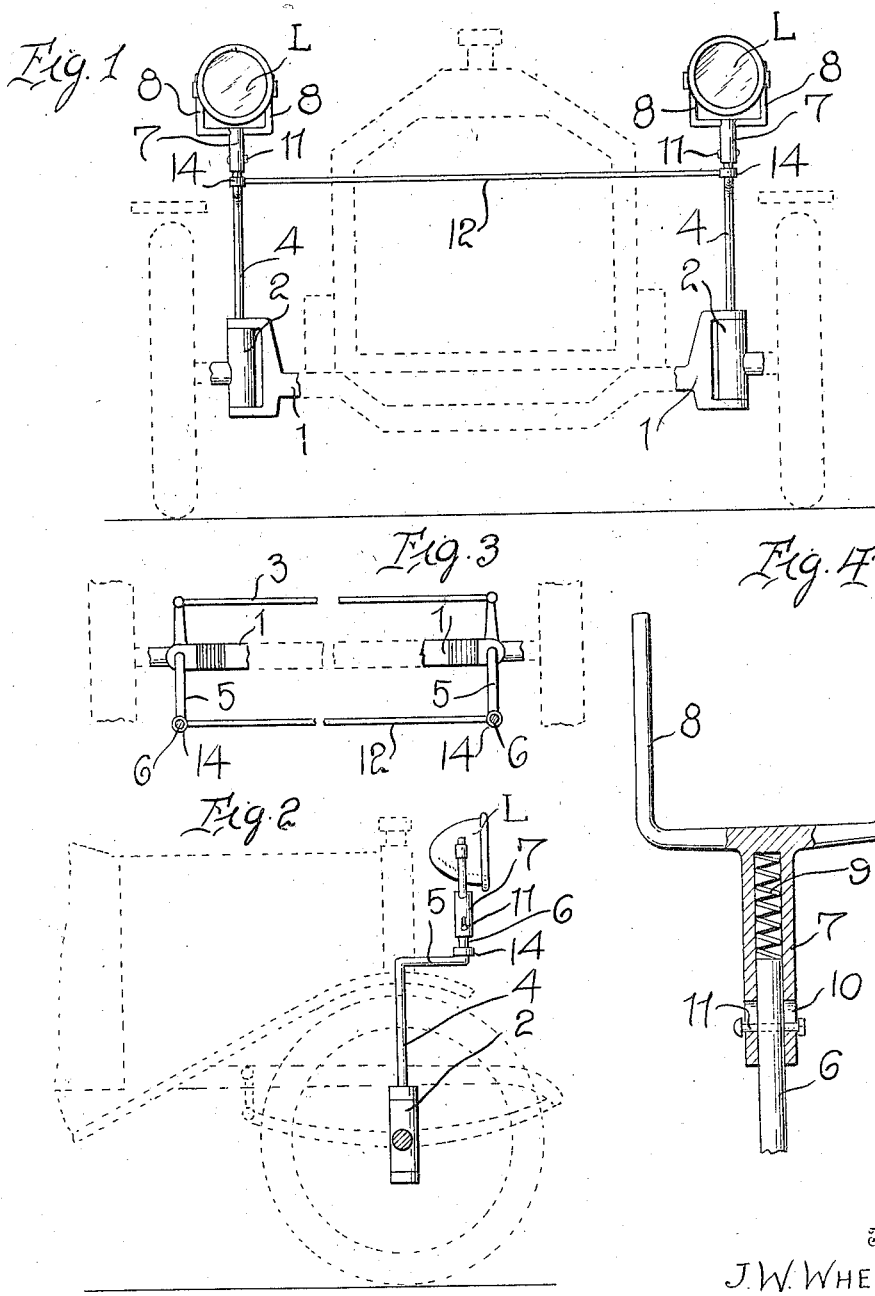

JOHN W. WHETHAM, OF MIDVALE, NEW JERSEY.

HEADLIGHT OR LAMP FOR VEHICLES.

1,146,041.   Specification of Letters Patent.   Patented July 13, 1915.

Application filed September 21, 1914. Serial No. 862,735.

*To all whom it may concern:*

Be it known that I, JOHN W. WHETHAM, a citizen of the United States, residing at Midvale, in the county of Passaic and State of New Jersey, have invented certain new and useful Improvements in Headlights or Lamps for Vehicles, of which the following is a specification, reference being had to the accompanying drawings.

This invention relates to certain improvements in headlights or lamps for vehicles, and the object of the invention is to provide a device of this general character having novel and improved means whereby the lamps of the vehicle will be shifted to at all times cast the rays of light in the path of the vehicle.

The invention consists in the details of construction and in the combination and arrangement of the several parts of my improved headlight or lamp for vehicles whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in elevation of a headlight constructed in accordance with my invention in applied position, the coacting vehicle being indicated by dotted lines; Fig. 2 is a side elevational view, partly in section, of the device as disclosed in Fig. 1; Fig. 3 is a fragmentary view in top plan illustrating certain features of the invention as herein embodied; and Fig. 4 is an enlarged view, partly in section and partly in elevation, illustrating in detail certain features of the invention as herein embodied.

As disclosed in the accompanying drawings, 1 denotes the forward axle of a vehicle A, herein indicated by dotted lines as a conventional automobile, provided with the steering knuckles 2 tied or connected for simultaneous movement by the rod 3. As the particular means for imparting steering movement to the knuckles 2 forms no part of my present invention, it is thought that a detailed disclosure thereof is unnecessary. Projecting upwardly from each of the knuckles 2 and constituting a pivot thereof is an arm 4 having its upper extremity angularly disposed, as indicated at 5, into substantially an L-shape. The vertical member 6 of the angular portion 5 is adapted to be loosely projected within the tubular stem 7 of a lamp bracket 8 and is capable of longitudinal movement independently of the vertical member 6 and in order to compensate for any jar or vibration during the travel of the vehicle A, I find it of advantage to secure to the upper extremity of the vertical member 6 a coil spring 9 which is adapted to contact with the inner end of the tubular stem 7 whereby it will be readily perceived that the shock or vibration is readily and conveniently absorbed whereby the possibility of injury to the lamp L supported by the bracket is substantially entirely obviated. I also find it of advantage to have the lower free end portion of the stem 7 provided with the diametrically opposed longitudinally directed elongated slots 10 through which the pin 11 is directed, said pin being also disposed through the vertical member 6, as is believed to be particularly shown in detail Fig. 4. By this arrangement, it will be readily perceived that the tubular member 7 and the coacting bracket 8 are held against axial rotation independently of the vertical member 6.

In order to give additional strength and rigidity to the arms 4, I tie or connect the same by the rigid bar or link 12, the extremities whereof being provided with the eyes 14 through which the vertical members 6 are disposed.

From the foregoing description, it is thought to be obvious that a headlight, constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with a vehicle and a steering knuckle engaged therewith, a vertically disposed member forming a pivot for the steering knuckle, the upper extremity of said vertical member being angularly disposed, a lamp supporting bracket provided with a tubular stem adapted to receive the free extremity of the angular portion of the vertical member, and an expansible member interposed between the extremity of the vertical member and the inner end of the tubular stem.

2. In combination with a vehicle and a steering knuckle engaged therewith, a vertically disposed member forming a pivot for the steering knuckle, the upper extremity of said vertical member being angularly disposed, a lamp supporting bracket provided with a tubular stem adapted to receive the free extremity of the angular portion of the vertical member, an expansible member interposed between the extremity of the vertical member and the inner end of the tubular stem, and coacting means carried by the vertical member and the stem for holding the same against axial rotation independently of the vertical member.

In testimony whereof I hereunto affix my signature in the presence of two witnesses.

JOHN W. WHETHAM.

Witnesses:
  Thomas Trengrove,
  George Whetham.